J. B. FLOGERZI.
MASTER CUT OVER SWITCH.
APPLICATION FILED JUNE 28, 1916.
1,273,211.
Patented July 23, 1918.
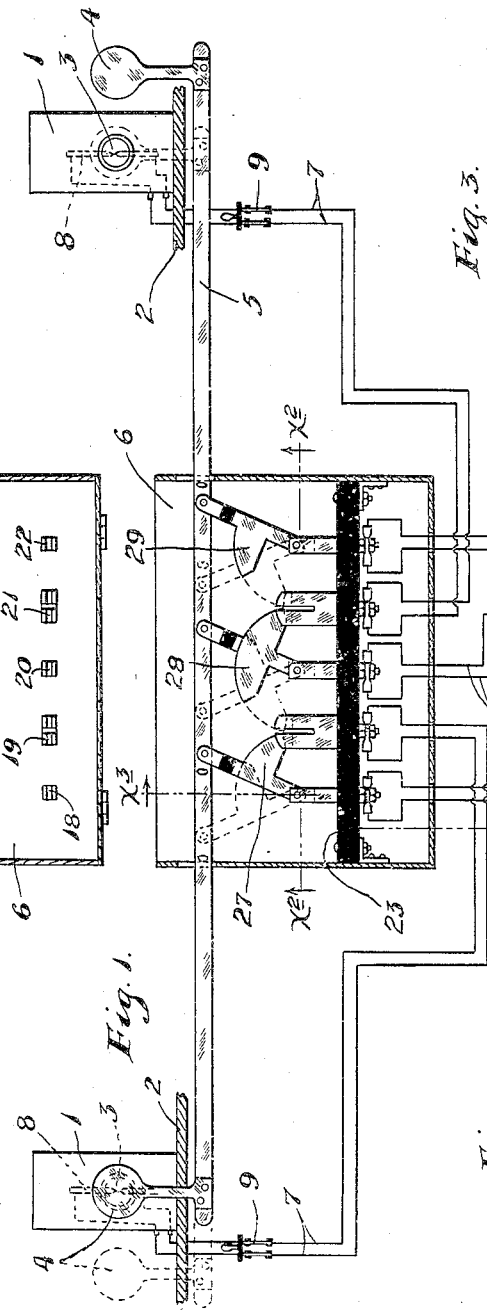
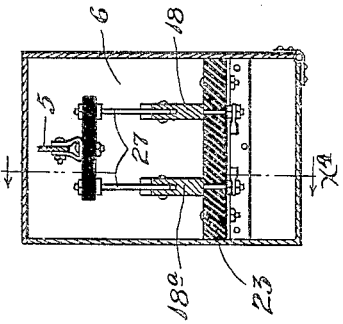
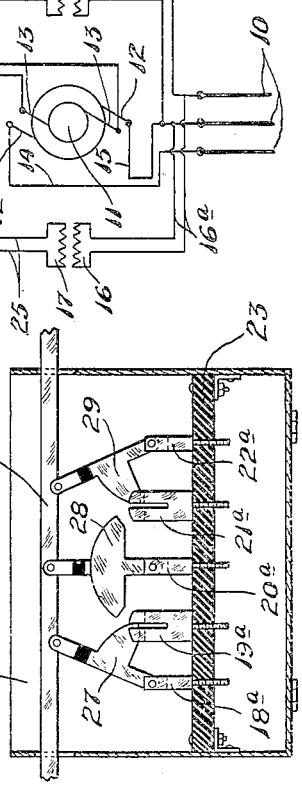
Witnesses.
H. L. Opsahl.
E. C. Wells
Inventor.
John B. Flogerzi.
By his Attorneys.
Williamson Merchant

UNITED STATES PATENT OFFICE.

JOHN B. FLOGERZI, OF ST. PAUL, MINNESOTA.

MASTER CUT-OVER SWITCH.

1,273,211.　　　　Specification of Letters Patent.　　Patented July 23, 1918.

Application filed June 28, 1916. Serial No. 106,384.

*To all whom it may concern:*

Be it known that I, JOHN B. FLOGERZI, a citizen of the United States, residing at St. Paul, in the county of Ramsey and State of Minnesota, have invented certain new and useful Improvements in Master Cut-Over Switches; and I do hereby declare the following to be a full, clear, and exact description of the invention, such as will enable others skilled in the art to which is appertains to make and use the same.

My invention has for its object to provide an improvement in what is generally known as the master cut over switch of moving picture apparatus, and to such ends, generally stated, the invention consists of the novel devices and combinations of devices hereinafter described and defined in the claims.

In motion picture theaters, it is the practice to install two motion picture machines, so that the one or the other, thereof, may be kept in action while the other is being adjusted and a new reel substituted therein. Usually these two machines are placed side by side, some little distance apart, and for alternately cutting off and projecting the light therefrom, coöperating shutters are connected for simultaneous movement, so that when the lens tube of one machine is uncovered, the lens tube of the other will be covered, and vice versa.

The source of current supply is almost always an alternating current. An alternating current is as good or better than a direct current for heating up the carbons of the arc lamps of the motion picture machines but practice has shown that a direct current through the arc lamp gives by far the best picture projection, and, in fact, is required for highly satisfactory results. To convert the alternating into a direct current at the motion picture house or local installation, it has been the practice to employ a converter of the rotary or other suitable type. In accordance with the practice of electric current supply companies, the rating, or charge for current is generally proportioned to or depending in some way upon the capacity of the converter. Otherwise stated, the smaller the capacity of the converter or converters, the lower will be the rate paid for the current used.

With the old arrangement for two moving picture machines where continuous action is required, either two rotary converters, one of sufficient capacity for each motion picture machine, or a single converter of double capacity would necessarily be employed. In accordance with my invention, however, I employ a single rotary converter for the two motion picture machines, and by suitable switch mechanism and coöperating electrical connections and devices, I provide means whereby the direct current from the converter may always be directed through the motion picture machine which is in actual use to project the picture, and the alternating current may be used to warm up the carbons of the machine that is out of action and is about to be put into action.

In the accompanying drawings which illustrate the invention, like characters indicate like parts throughout the several views.

Referring to the drawings:

Figure 1 is a view partly in vertical section and partly in diagram, illustrating my invention;

Fig. 2 is a horizontal section taken approximately on the line $x^2$ $x^2$ of Fig. 1, some parts being removed;

Fig. 3 is a vertical section taken approximately on the line $x^3$ $x^3$ of Fig. 1; and Fig. 4 is a section taken through the switch proper on the line $x^4$ $x^4$ of Fig. 3, but illustrating a different adjustment of the switch elements.

In Fig. 1, two motion picture machines of standard construction are indicated, as entireties, by the numeral 1, said machine is shown as mounted on suitable supports 2 and is provided with the customary lens tubes 3 through which the light beams from the arc lamps within the casings or light boxes of the machines will be projected.

The numeral 4 indicates shutters that coöperate, one with each of the lens tubes 3, and are connected to the opposite ends of a horizontally movable bar 5. This bar 5, as shown, is arranged to slide through openings in the ends of a switch box 6 that is rigidly supported by any suitable means, not shown. The shutters 4 are so applied to the bar 5 that by the endwise movements of said bar, the left hand shutter will cover the left hand lens tube 3 and the right hand shutter will open the right hand lens tube when said bar is moved toward the right, as shown by full lines in Fig. 1; and conversely, the right hand shutter will cover the right hand lens tube and the left hand shutter will uncover the left hand lens tube when said bar 5 is moved toward the left, as indicated by dotted lines in Fig. 1.

The numeral 7 indicates leads from the carbons 8 of the arc lamps contained within the light box or casing 1. In these leads 7, are suitable cut-out switches 9.

The numeral 10 indicates the three terminals or branches of the main line through which the alternating current is supplied. The numeral 11 indicates a rotary converter of well known construction having the usual two pairs of brushes 12 and 13. The contact brushes 12 are connected to two of the line wires 10, by means of wires 14 and 15. For each of the two motion picture machines, there is a transformer, of which the numeral 16 indicates the primary coil and the numeral 17 the secondary coil. Said primary coils 16 are connected across two of the light wires 10 by wires 16$^a$.

The switch proper comprises five pairs of contacts 18—18$^a$, 19—19$^a$, 20—20$^a$, 21—21$^a$, and 22—22$^a$, all of which contacts are rigidly secured to an insulating base or plate 23, which, in turn, is rigidly secured with the switch box 6. The leads 7 from the arc lamp of the left hand motion picture machine are connected, one to each of the contacts 19—19$^a$, and likewise, the leads 7 from the arc lamp of the right hand motion picture machine are connected, one to each of the contacts 21—21$^a$. The contact brushes 13 of the converter, by wires 24, are connected, one to each of the intermediate contacts 20—20$^a$. The secondary coil 17 of the left hand transformer is connected by wires 25 to the contacts 18—18$^a$, and likewise, the secondary coil of the right hand transformer is connected by wires 26 to the contacts 22—22$^a$.

The said contacts 18 to 22, inclusive, and 18$^a$ to 22$^a$, inclusive, are all preferably bifurcated. The said contacts 18—18$^a$ and 20—20$^a$ and 22—22$^a$, all have pivoted, or otherwise movable contact blades that are connected to the shoulder actuating bar 5 and are movable into and out of contact with the coöperating contacts 19$^a$ and 21$^a$. More specifically described, contact blades 27 are pivoted to the contacts 18—18$^a$, double end contact blades 28 are pivoted to the intermediate contacts 20—20$^a$, and contact blades 29 are pivoted to the contact 22—22$^a$, and all of these contact blades have insulated ends normally pivoted to the shutter bar 5.

The operation is substantially as follows:

Assume first that the right hand picture machine, as shown in Fig. 1, is in action and that the left hand machine is out of action or, at least, that its lens tube is covered by the coöperating shutter 4. This is a condition illustrated in Fig. 1, by reference to which it will be noted that under the said adjustment of the switch there shown, the direct current delivered from the converter and through wires 24 will flow as follows: to-wit, first through one of the said wires 24, contact 20, contact blade 28, contact 21, and one of the leads 7 to the lamp carbons 8, and thence, through the other lead 7 to contact 21$^a$, to far side contact blade 28 and contact 20$^a$, and the other lead 24 back to said converter. This, as is evident, gives a direct current in the arc lamp of the operating motion picture machine. At the same time, if the left hand switch 9 be closed, alternating current will be supplied to the carbons of the left hand motion picture machine, the lens tube of which is then covered so that the said left hand machine is out of action, except that it may be warmed up and put in condition for use at the exact desired instant, the flow of the alternating current from the secondary coil 17 of the left hand transformer is then as follows:

Through one wire 25, contact 18 near contact blade 27, contact 19, and one of the left hand leads 7 to the lamp carbons 8, and from thence back through the other lead 7, contact 19$^a$, far side contact blade 27, contact 18$^a$ and the other wire 25, back to said secondary coil 17.

Assuming now that the right hand motion picture machine has been kept in action while the left hand machine has been supplied with new film, properly adjusted, and the carbons of its lamp properly heated by the alternated current, and that it is now desired to instantaneously, throw the said left hand machine into action. This may be done simply by giving the shutter bar 5 a quick movement toward the left from its full line to its dotted line position, Fig. 1. This movement of the said bar causes the right hand shutter to cover the lens tube of the right hand machine and the left hand shutter 4 to uncover or open up the lens tube of the left hand machine, and simultaneously therewith, the contact blades 27, 28 and 29 are moved into the dotted line position, Fig. 1. This whole adjustment may be so quickly accomplished that the change from the one machine to the other and from the alternated to direct current will not be perceived by a person viewing the projected picture. Of course, by means of the switches 9, either of the two machines may be entirely cut out, at will.

If anything should happen to the converter, both of the moving picture machines may be connected to the alternating current supply by disconnecting the contact blades 27, 28 and 29, from the shutter 5 and setting the same, as shown in Fig. 4, in which case, both sets of leads 7 will be connected to the secondary coil 17 of the respective transformers. The two machines may then be independently cut into and out of action by the switches 9.

In actual practice, the above described switch mechanism, combined with shutters as shown, has been found highly efficient for the purposes had in view, and it has also been found that by the use thereof, a very great saving in cost of current supply is also effected.

What I claim is:

1. The combination with two moving picture machines, of sources of alternating and direct currents supplying the electrical connections thereof, to said two machines, switch mechanisms arranged to alternately connect the two sources of supply to said machines, and light controlling means coöperatively connected with said switch and arranged to alternately project beams of light from the two machines.

2. The combination with two moving picture machines, of sources of alternating and direct current supply and electrical connections therefrom to the said two machines, switch mechanism arranged to alternately connect the two sources of supply to the said two machines, and shutters connected to said switch mechanism and operative to alternately cut the said machines into and out of action on the screen.

3. The combination with two moving picture machines, of sources of alternating and direct current supply and electrical connections therefrom to the said two machines, switch mechanism arranged to alternately connect the two sources of supply to the said two machines, and shutters having a connecting bar connected to the movable elements of said switch and arranged to open the lens tube of the machine connected to the direct current source, and to close the lens tube of the machine connected to the alternating current source.

4. The combination with two moving picture machines, a converter and current transforming means, of electrical connections between said converter, transforming means and said two moving picture machines, a switch mechanism in the said electrical connections and movable elements arranged in one position to connect one of said machines to said converter, and the other machine to said transforming means, and in another position, to reverse the order of connection to the said two machines, and shutters in the said motion picture machines connected to the movable elements of said switch mechanism.

5. A switch mechanism comprising two pairs of laterally spaced movable contacts, a pair of intermediate laterally spaced movable contacts and two pairs of laterally spaced fixed contacts, one pair between the said intermediate movable contacts and each outer pair of movable contacts, and means connecting the said movable contacts for common movements alternately into engagement with the coöperating fixed contacts, in combination with two motion picture machines, a converter, two transformers, leads from the said converter electrically connected to the said intermediate movable contacts, leads from said transformers connected to the said outer movable contacts, independent leads from the said fixed contacts to the respective motion picture machines, the said switch mechanism thus arranged, operating in one position to connect one of the said motion picture machines to said converter and one of said transformers to the other motion picture machine, and operative in another position to reverse the said order of connection of the machines, and shutters for the said motion picture machines connected to the movable contacts of said switch mechanism.

In testimony whereof I affix my signature in presence of two witnesses.

JOHN B. FLOGERZI.

Witnesses:
 CLARA DEMAREST,
 EVA E. KÖNIG.